United States Patent [19]

Yoshioka et al.

[11] Patent Number: 5,194,363
[45] Date of Patent: Mar. 16, 1993

[54] OPTICAL RECORDING MEDIUM AND PRODUCTION PROCESS FOR THE MEDIUM

[75] Inventors: Kazumi Yoshioka, Kyoto; Takeo Ohta, Nara; Masami Uchida; Katsumi Kawahara, both of Osaka; Shigeaki Furukawa, Nara, all of Japan

[73] Assignee: Matsushita Electric Industrial Co., Ltd., Osaka, Japan

[21] Appl. No.: 559,166

[22] Filed: Jul. 30, 1990

[30] Foreign Application Priority Data

| Apr. 27, 1990 | [JP] | Japan | 2-113380 |
| Apr. 27, 1990 | [JP] | Japan | 2-113382 |
| Apr. 27, 1990 | [JP] | Japan | 2-113383 |
| May 10, 1990 | [JP] | Japan | 2-121481 |
| Jun. 19, 1990 | [JP] | Japan | 2-160735 |
| Jun. 19, 1990 | [JP] | Japan | 2-160736 |

[51] Int. Cl.$^5$ .................... G03C 1/00; G11B 7/24; G11B 11/12
[52] U.S. Cl. .................... 430/271; 430/495; 430/945; 369/288; 369/275.2; 346/135.1
[58] Field of Search .............. 430/495, 270, 19, 271; 365/113; 369/286, 275.2, 288; 346/135.1; 428/64

[56] References Cited

U.S. PATENT DOCUMENTS

| 4,499,178 | 2/1985 | Wada et al. | 430/495 |
| 4,670,345 | 6/1989 | Morimoto et al. | 346/135.1 |
| 4,984,231 | 1/1991 | Yasuoka et al. | 369/288 |
| 5,024,910 | 6/1991 | Ohta et al. | 430/495 |
| 5,034,255 | 7/1991 | Shigematsu et al. | 346/135.1 |

FOREIGN PATENT DOCUMENTS 58-143679 2/1985 Japan ..................... 430/19

OTHER PUBLICATIONS

Phase Change Disk Media Having Rapid Cooling Structure Technical paper by Ohta et al., published in the Japanese Journal of Applied Physics, vol. 28 (1989).
Million Cycle Overwritable Phase Change Optical Disk Media Technical paper by Ohta et al., presented at the SPIE vol. 1078 Optical Data Storage Topical Meeting, Jan. 17-19, 1989.

Primary Examiner—Charles L. Bowers, Jr.
Assistant Examiner—Martin Angebrannt
Attorney, Agent, or Firm—Amster, Rothstein & Ebenstein

[57] ABSTRACT

An optical information recording medium is provided in which the active layer is a phase change material capable of absorbing energy and being converted between a substantially amorphous state and a substantially crystalline state. The active layer contains nitrogen, which may be in the form of a nitride or nitrides of the constituent elements of the active layer, or may be a nitrided surface thereof. The inclusion of nitrogen inhibits localized shifting of the active material, which leads to degradation of the recording/erase properties of the medium. The optical recording medium includes a substrate, onto which is deposited in sequence a first dielectric layer, a nitrogen-containing active layer, a second dielectric layer, and a metallic reflecting layer. The second dielectric layer is made thin, so that the cooling rate of the active layer is increased to form a more uniform amorphous state.

15 Claims, 3 Drawing Sheets

OPTICAL RECORDING MEDIUM AND PRODUCTION PROCESS FOR THE MEDIUM

The present invention relates to an optical information storage medium having a large memory capacity in which the temperature of an active recording layer is controllably elevated by optical irradiation, thereby causing structural phase changes or atomic rearrangements in the active layer by which the information is either recorded or erased.

BACKGROUND OF THE INVENTION

Optical recording discs in the prior art include non-erasable write-once systems which utilize as the active recording layer a $TeO_x$ ($0 < X < 2.0$) thin film formed from Te and $TeO_2$. Erasable discs have also been reported and are being developed for practical applications in which it is possible to repeatedly write and erase information by optical means. In such erasable optical discs, a thin film layer of material is typically heated and melted by laser light, then rapidly cooled so that its structure is in a substantially non-crystalline or amorphous state, thereby recording information which is indicated by the optical properties of the substantially non-crystalline or amorphous state. The recorded information can be subsequently erased by heating the active layer, and then slowly cooling it so that its atomic structure anneals and transforms into a substantially crystalline state, having different optical properties from that of the amorphous state, which indicate thereby an erased condition.

Materials investigated as active layers for erasable discs which operate via a phase change mechanism involving an amorphous/crystalline transition include various combinations of the chalcogen elements as exemplified by $Ge_{15}Te_{81}Sb_2S_2$. Such combinations have been studied by Ovshinsky et. al and Feinleib et al. (see Appl. Phys. Lett., vol. 18 (1971)). In addition, thin film active layers consisting of combinations of a chalcogen element or elements with an element or elements chosen from Group V of the periodic table or an element or elements chosen from Group IV of the periodic table, e.g. Ge, $As_2S_3$, $As_2Se_3$ or $Sb_2Se_3$ are known and have been studied in the prior art.

It is possible to produce an optical disc having thin film active layers on a substrate in which grooves are formed for the purpose of guiding the laser light. With respect to the utilization of such optical disc for the recording and erasing of information by laser light, the active layer is generally crystallized in advance, and a laser beam focused to a spot size of about 1 micron is intensity modulated between a peak power level and a lower bias power level with the recorded information. For example, a circular recording disk may be rotated and irradiated during rotation with pulses of laser light having a peak power sufficient to increase the temperature of the irradiated areas on the active layer above the melting point of the layer. If the irradiated areas are permitted to cool rapidly, the information will be recorded by the formation of substantially non-crystalline or amorphous marks at the locations of the irradiated areas.

Amorphous areas of the disc which are irradiated with the lower bias power level of the laser light can have the temperature in those areas elevated above the crystallization temperature of the active layer, in which case the active layer at those irradiated areas will be transformed back into a substantially crystalline structure, and the recorded information will thereby be erased, making it possible to over-write information. In this manner, areas on the active layer may be repeatedly cycled above the melting point thereof to produce recorded amorphous areas, or above the crystallization temperature thereof to produce crystalline erased areas, thereby effectuating the recording or overwriting of binary information.

Typically, the active layer in an optical disc is sandwiched between dielectric layers which have excellent heat resistance characteristics. These dielectric layers serve to contain the active layer and to protect a substrate and an adhesive layer from undergoing large changes in temperature during irradiation. Since the thermal behavior of the active layer, both as to it its ability to rapidly increase in temperature, as well as its rapid cooling and slow cooling characteristics, depend on the thermal conductivity of these dielectric layers, it is possible to optimize the recording and erasing characteristics by properly choosing the materials of the dielectric layers and by carefully controlling the thickness and composition of these layers.

Important design parameters which must be considered in developing and optimizing an erasable overwrite optical recording medium are the erasability of the medium and the cyclability of the recording and erasing characteristics over many write/erase cycles.

With regard to the cyclability characteristics, studies have shown that there is a deterioration after a large number of write/erase cycles which results from thermal damage to the disc substrate or protective layer and which is manifested as an increase in noise. Further, studies have also shown that even in the absence of such thermal damage, a shift or physical distortion of the active layer along the direction of rotation of the disc may occur after many write/erase cycles as a result of thermally induced stress and distortion of the protective dielectric layers induced by the repeated heating and cooling cycles (see *SPIE Optical Data Storage Topical Meeting*, vol. 1078, p.27, Ohta et al.).

With regard to the erase characteristics, the melting point of non-crystalline films containing Te typically covers a wide temperature range of 400° C. to 900° C. As explained above, crystallization may be achieved by irradiating the active layer with laser light to increase its temperature, followed by a gradual cooling. The required temperature is generally within a range close to the crystallization temperature of the material, which is less that the melting point. When the crystallized film is irradiated with laser light having a higher power and is heated above the melting point, the film, upon rapid cool down, becomes substantially non-crystalline or amorphous, and an optically detectable mark is formed.

If the amorphous state is selected to represent the recorded condition, it is known that a more rapid cooling results in a more uniform amorphous state and results in a mark which produces a better and more stable signal. (See "Phase Change Disk Media Having Rapid Cooling Structure, Ohta et al., *Jap. J. Appl. Phys.* vol 28, 123 (1989)). These studies have shown that when the rate of cooling is too low, there arises a difference in the degree of non-crystallinity between the center of the mark and the periphery of the mark. During erasure, the mark is recrystallized. If the recorded mark is non-uniform in structure, the crystallization which occurs during subsequent erasure will be rendered non-uniform as well, resulting in a recording medium with less than optimum erasure characteristics.

SUMMARY OF THE INVENTION

It is an object of the present invention to provide an improved optical recording medium having an active recording thin film layer which can be rendered substantially non-crystalline or amorphous upon absorption of laser light energy, whereby a melting and rapid cooling of the active layer is produced; and which can be rendered substantially crystalline by heating the amorphous layer above the crystallization temperature.

It is a further object of the present invention to provide an erasable optical information recording medium with improved over-write cyclability characteristics and improved laser power dependence characteristics.

It is yet a further object of the present invention to provide an optical recording medium which has improved thermal characteristics, and improved long term stability with respect to thermal stress and deterioration induced by many write/erase cycles.

A still further object of the present invention is to provide a process for manufacture of an erasable optical information recording medium having such improved characteristics.

Accordingly, there is provided an optical recording medium having an active layer which is capable of absorbing energy and being converted between a substantially non-crystalline amorphous state and a substantially crystalline state, wherein the active layer includes nitrogen. The optical recording medium generally comprises a structure which includes a substrate, a first dielectric layer formed on one surface of the substrate, an active layer formed on top of the first dielectric layer wherein the active layer includes nitrogen, a second dielectric layer formed on top of the active layer, and a reflecting layer formed on top of the second dielectric layer. The active layer may be formed by incorporation of nitrogen into a chalcogenide composition of Ge, Te, and Sb The nitrogen may be incorporated as a nitride of one of the chalcogen elements, or may form a nitrided surface layer on the chalcogen composition. The active layer may be produced by sputtering a target in a nitrogen containing rare gas mixture, or by sputtering a target which includes a nitride composition.

As explained, one of the factors which contributes to the deterioration of the recording and erasing characteristics after many write/erase cycles is a localized shift of the material in the active layer. To prevent or reduce the tendency for this shift to occur, in the present invention, nitrogen or a nitride substance is incorporated in the active layer or on its surface.

Furthermore, the optical recording medium which incorporates this active recording layer sandwiches the recording layer between a first dielectric layer formed on one side of a transparent substrate, and a second dielectric layer. The second dielectric layer has a metallic reflecting layer formed on the other side thereof. By making the film thickness of the second dielectric layer thinner than that of the first dielectric layer, the metallic reflecting layer is thereby placed closer to the active recording layer, and is able to more rapidly dissipate the heat generated in the active layer by the laser light. This permits a rapid cool down to occur and a highly uniform amorphous mark to be produced. The high uniformity of the amorphous mark is desirable for optimizing the erase characteristics of the material.

The above mentioned composition of the recording layer and overall structure of the optical recording medium therefore inhibits the melt shifting which is known to occur in recording layers having other compositions, and results in a structure in which the long term cyclability and stability of the record/erase characteristics and power dependency of the laser light is improved over the prior art.

BRIEF DESCRIPTION OF THE DRAWINGS

For a fuller understanding the nature, features and advantages of the present invention, reference should be made to the following detailed description of various preferred, but nonetheless illustrative embodiments of the invention, as illustrated by and taken in conjunction with the accompanying drawings wherein.

DESCRIPTION OF THE PREFERRED EMBODIMENTS

Figure 1:
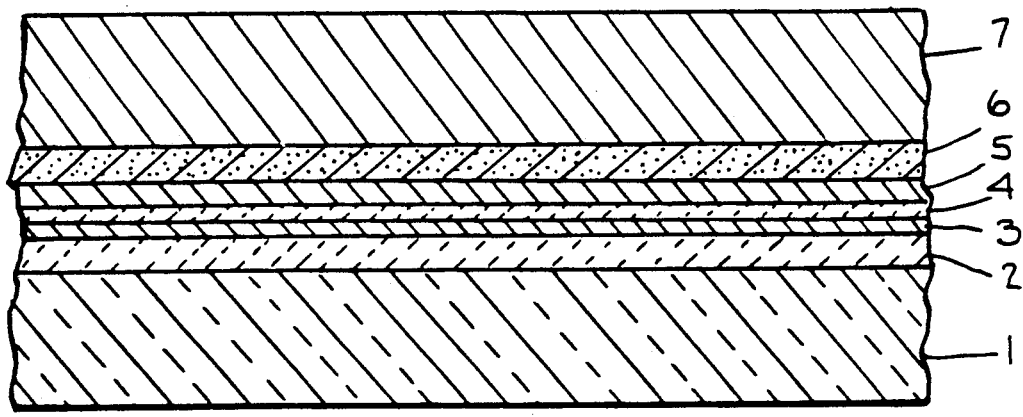
FIG. 1 is a cross sectional view which shows the structure of an optical information recording medium in accordance with the first and second embodiments of the invention.

With reference to FIG. 1, there is shown a cross sectional view of an optical recording medium which includes a disc substrate 1 which may be a resin substrate formed from poly-carbonate or other similar material. The disc substrate 1 may have grooves preformed therein for guiding the laser light, which is shown as incident on the disc in the direction of the arrow denoted by reference numeral 8. Alternatively disc substrate 1 may be a glass plate formed by the 2P process, a substrate prepared by directly forming grooves on a glass plate, or a substrate on which bit rows for guiding laser light have been preformed thereon.

As shown in FIG. 1, a first dielectric layer 2 of approximately 160 nm in thickness, which may consist of a mixed film of ZnS and $SiO_2$, is formed on top of disc substrate 1. The first dielectric layer 2 has deposited thereon an active layer 3 having a thickness of approximately 20–30 nm, in which nitrogen is incorporated into a composition of Te-Ge-Sb. A second dielectric layer 4 covers the active, recording layer 3. The second dielectric layer 4 may be of the same composition as the first dielectric layer 2, but has a thickness of only approximately 20 nm. Covering the top of the second dielectric layer 4 is a reflecting layer 5 which may be an Al alloy. Finally, to complete the structure, a protective plate 7 is adhered to the top of the reflective layer 5 by means of an adhesive layer 6. Protective plate 7 may be another disc, and in such case top and bottom surfaces of the optical recording medium are discs.

In the structure shown in FIG. 1, the laser light for recording, erasing, and reproducing the information contained therein is incident in the direction shown by arrow 8, and has an intensity which is modulated with the information. Detection of the recorded information may be performed by detecting the reflected light.

To produce the two dielectric layers 2,4, the active layer 3, and reflecting layer 5, a vacuum deposition or embodiment of the active layer 3, for example, a sputtering process may be used in which sputtering is performed in a mixture of a rare gas such as argon and nitrogen gas. During such sputter deposition, the partial pressure of nitrogen in the gas is an important process parameter which determines the characteristics and quality of the active layer 3. During sputtering of the active layer 3, an appropriate range for the partial pressure of nitrogen is $1.0 \times 10^{315}$ Torr to $1.0 \times 10^{-4}$ Torr. If the nitrogen partial pressure is less than approximately $10^{-5}$ Torr, then the effect of nitrogen during sputtering becomes small, and consequently the improvement of the cyclability characteristics as a result of the inclusion of nitrogen in the Te-Ge-Sb active layer structure becomes small. On the other hand, if the partial pressure of nitrogen during sputtering is greater than about $10^{-4}$ Torr, the optical characteristics of the active layer 3, such as the refractive index are affected, and the basic recording and erasing characteristics of the active layer 3, such as the speed of crystallization and non-crystallization move away from their optimum range. Accordingly, the above-mentioned range for the partial pressure of nitrogen during sputter deposition is most appropriate.

With respect to the first dielectric layer 2 and the second dielectric layer 4, the mixing ratio of ZnS and $SiO_2$ is generally selected so that the $SiO_2$ comprises 20 mol % of the overall composition. The composition need not, however, be so limited. However, if the $SiO_2$, is less than about 5 mol %, the effect of $SiO_2$, on the mixture, i.e. to reduce the diameter of the crystal particles, is diminished. On the other hand, if the concentration of $SiO_2$, is above 50 mol %, then the properties of the film degrade. Therefore, it is appropriate to keep the ratio of $SiO_2$ in the range of 5 to 40 mol %.

The thickness of the second dielectric layer 4 is made as thin as about 20 nm, so that the reflecting layer 5, which also acts as a thermal dissipation layer, is placed closer to the active layer 3. Thus the heat from the active layer 3 generated by the laser beam during recording and erasing may be rapidly conducted to the reflecting layer 5, producing a rapid cooling of the active layer 3 which results in a more uniform amorphous record mark.

Experiments have been performed on the disc structure of the first preferred embodiment of the invention as described above, in which the over-write characteristics of a signal of frequency $f1 = 3.43$ MHz and a signal of frequency $f2 = 1.25$ MHz were measured at an outer diameter of 130 mm, on a disc rotating at 1800 rpm, which corresponds to a linear speed of 8 m/sec. The over-write was carried out by a method of simultaneously recording and erasing, in which a substantially non-crystalline record mark was formed by irradiation at a high laser power level of 16 mw, and then crystallized by irradiation at a low laser power level of 8 mw, with a circular laser spot of about 1 micron in diameter.

As a result of these measurements, a C/N ratio for the recorded signal of 55 db or greater was obtained, with an erasability of greater than 30 db. With respect to repetitive cycling, the bit error rates were measured, with no deterioration observed for over one million cycles.

As a second preferred embodiment, a recording layer is made of a chalcogen which contains a nitride/nitrides of at least one element selected from Te, Ge, and Sb. The optical recording medium consists of a substrate, and a 4-layer structure having a first dielectric layer, an active layer, a second dielectric layer, and a reflecting layer, configured as generally shown in FIG. 1. In this second embodiment, the active layer 3 contains a nitride/nitrides or an oxide/oxides of at least one element selected from Ge, Te, and Sb, and has a film thickness of about 20-30 nm.

To form the structure of the second preferred embodiment, a sputter deposition process or an electron beam evaporation process may be used. For sputter deposition, it is possible to fabricate a sputter target which contains a nitride/nitrides of Ge, Te, or Sb. With such target, it is possible to carry out the sputter deposition with only argon (Ar) gas. It is also Possible to allow the above-mentioned nitride/nitrides to be contained in a deposition source for use in electron beam evaporation.

The disc structure of this second preferred embodiment was studied by investigating the over-write characteristics using a signal of frequency $f1 = 3.43$ MHz and a signal of frequency $f2 = 1.25$ MHz applied at an outer diameter of 130 mm to a disc rotating at 1800 rpm, which corresponds to a linear speed of 8 m/sec. The over-write was carried out by a method of simultaneously recording and erasing, in which a substantially non-crystalline record mark was formed by irradiation at a high laser power level of 16 mw, and then crystallized by irradiation at a low laser power level of 8 mw, with a circular laser spot of about 1 micron in diameter.

As a result of these measurements, a C/N ratio for the recorded signal of 55 db or greater was obtained, with an erasability of greater than 30 db. With respect to repetitive cycling, the measurement of bit error rates showed no deterioration after more than one million cycles.

Figure 2:
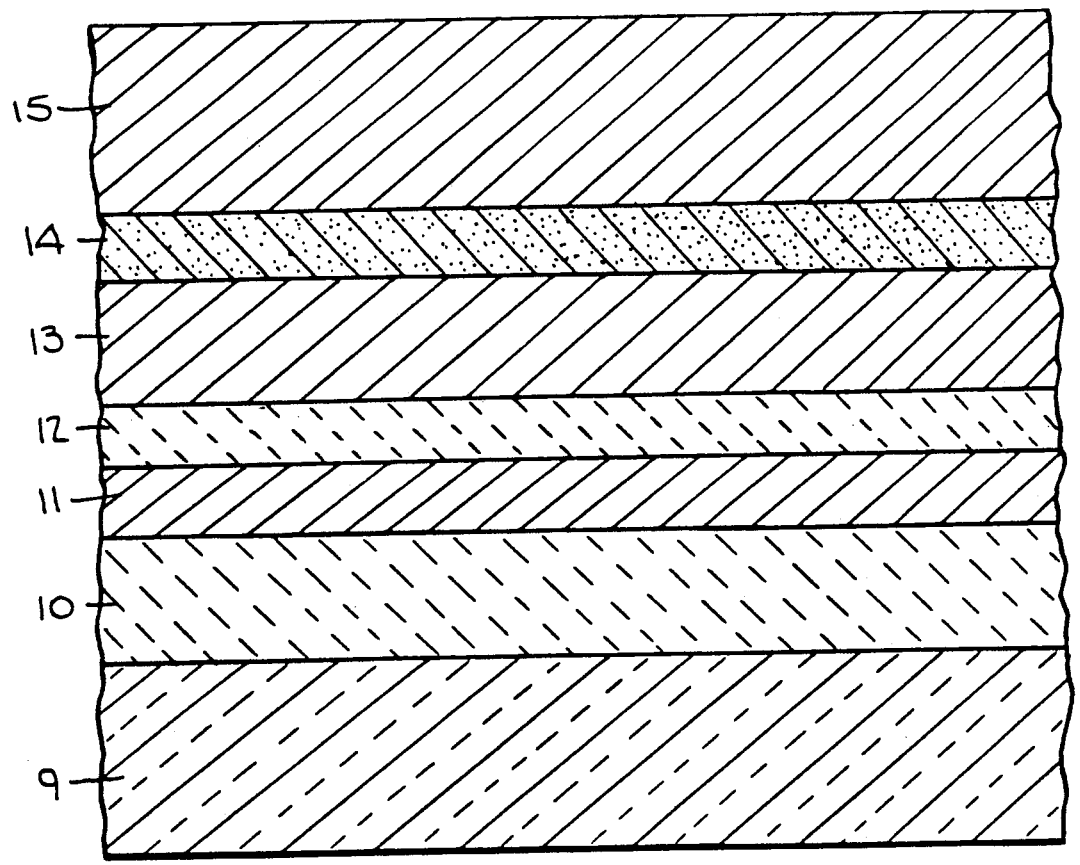
FIG. 2 is a cross sectional view which shows the structure of an optical information recording medium in accordance with a third embodiment of the present invention.

A third embodiment of the instant invention is now explained with reference to FIG. 2, wherein a disc substrate 9 is shown which may be a resin substrate on which grooves for guiding the laser light are preformed, a glass plate formed by the 2P process, a substrate prepared by directly forming grooves on a glass plate, or a substrate on which bit rows for guiding the laser light are provided thereon. Deposited on disc substrate 9 is a first dielectric layer 10, which may consist of a mixed film of ZnS and $SiO_2$. An active layer 11 is then deposited on top of the first dielectric layer 10. The active layer 11 is prepared by allowing a component consisting of a Te-Ge-Sb composition to be dispersed in a matrix of a nitride/nitrides or an oxide/oxides of at least one element chosen from Te, Ge and Sb. The film thickness of active layer 11 is in the range of approximately 20-120 nm. Covering the active layer 11 is a second dielectric layer 12, made from the same material as the first dielectric layer 10, which is deposited to a thickness of about 20 nm. A reflecting layer 13 of Al alloy covers the thin second dielectric layer 12. A protective plate 15 is adhered to the top of the structure by an adhesive layer 14.

In this third embodiment, the light absorption coefficient and film thickness of the active layer 11 are chosen in such a manner that in comparison with the first and second embodiments described above, the light absorption coefficient is small, and the film thickness of the recording layer 11 is thicker. When subjected to similar test conditions as described with respect to the first and second embodiments, the C/N ratio of the recorded signal was found to be 55 db or greater, with an erasability of 30 db or greater. As to the effects of repeated write/erase cycling of the medium, the bit error rates were measured, and no deterioration was observed for more than one million cycles.

Figure 3:
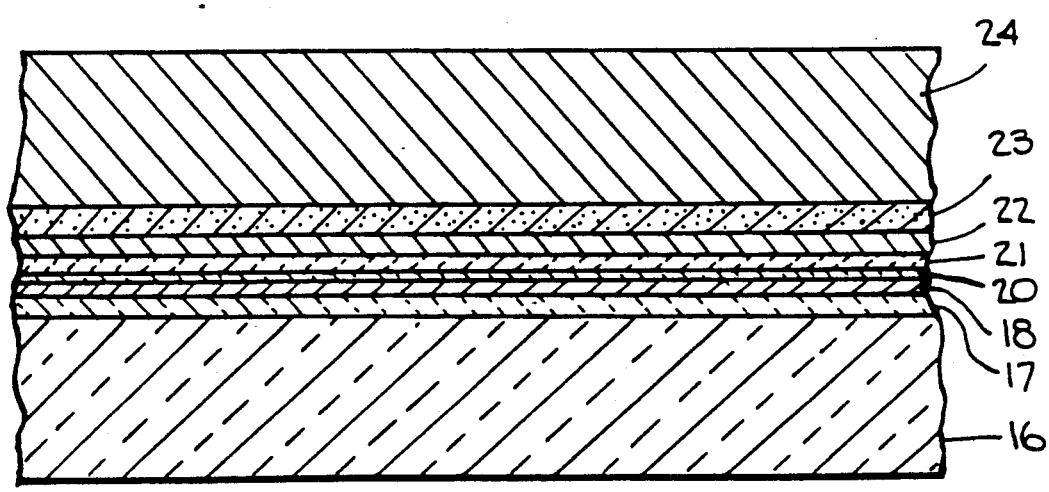
FIG. 3 is a cross sectional view which shows the structure of an optical information recording medium in accordance with yet another embodiment of the present invention.

A fourth embodiment of the invention is shown in FIG. 3. As shown therein, the optical recording medium may contain a disc substrate 16, which may be a resin substrate formed from poly-carbonate or other similar materials. Disc substrate 16 may have grooves preformed therein for guiding the laser light, shown as being incident in the direction of the arrow denoted by reference numeral 25. Alternatively, disc substrate 16 may be a glass plate formed by the 2P process, a substrate prepared by directly forming grooves on a glass plate, or a substrate on which bit rows for guiding laser light have been preformed thereon.

A first dielectric layer 17, which consists of a mixed film of Zn and $SiO_2$ having a film thickness of approximately 160 nm is deposited on top of the disc substrate 16. The next layer is an active layer 18, which has a Te-Ge-Sb ternary alloy composition as a component thereof, and a nitride/nitrides of at least one of the elements Ge, Te, or Sb, or an adsorption surface layer 20 of nitrogen provided on at least one surface of the active layer 18. A second dielectric layer 21, made from the same material as the first dielectric layer 17, and having a thickness of 20 nm covers the active layer 18. A reflecting layer 22 of Al alloy, having a thickness of about 120 nm covers the second dielectric layer 21. To complete the structure, a protective plate 24 is adhered to the reflecting layer 22 by an adhesive material layer 23.

Experimental measurements performed on this structure, using the parameters described above with respect to the aforementioned embodiments, resulted in a C/N ratio for the recorded signal of 55 db or greater, and an erasability of 30 db or greater. Further, no deterioration was found in the write/erase characteristics after more than one million write/erase cycles.

Figure 4:
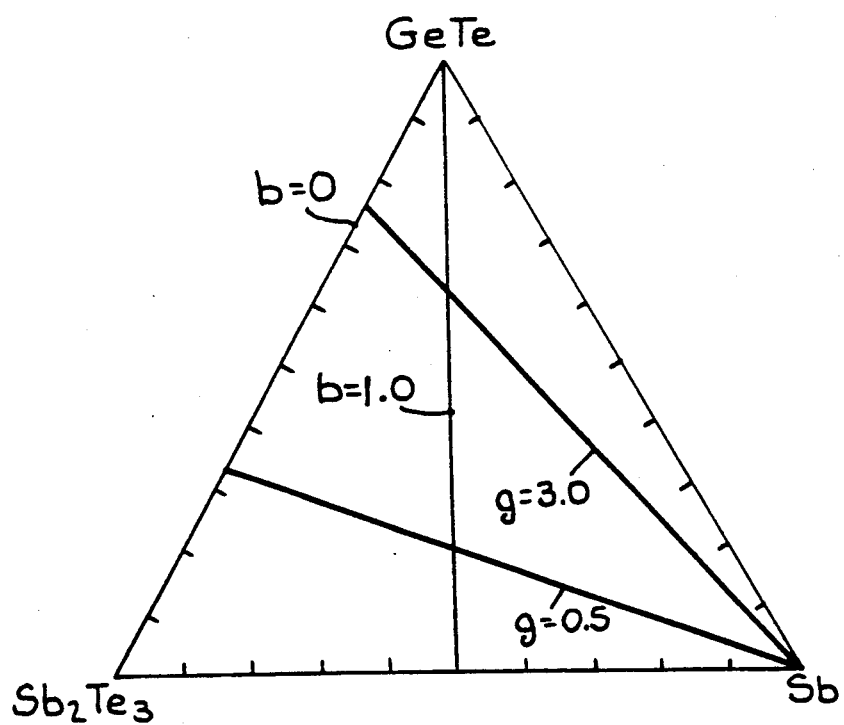
FIG. 4 is a triangular composition diagram showing the preferred composition of the active layer of one embodiment of the present invention.

In a preferred embodiment of this invention, an active recording layer is made from a material which incorporates nitrogen in a Ge, Te and Sb composition. It is especially effective to incorporate nitrogen in a composition range shown in the triangle diagram of FIG. 4, which represents the compositions of the ternary alloy system $GeTe-Sb_2Te_3$-Sb. With such a composition, it is possible to obtain stable characteristics above one million cycles by appropriately selecting the laser power for recording and erasing. Furthermore, in addition to obtaining improved stability characteristics beyond one million write/erase cycles over a wide range of laser power, it is also possible to improve the recording sensitivity of the active layer by permitting the layer to contain nitrogen or by allowing it to contain a nitride/nitrides of at least one element of Ge, Te and Sb. If $b=Sb/Sb_2Te_3$ (denoting the mole ratio of these two constituents), then an especially effective composition range for the active recording layer is $0<b<1.0$. If b is too small, then the effect of the Te component may become excessive, and render the active layer poor with respect to oxidation resistance. On the other hand, if $b>1.0$, then the speed of erasure is reduced. Furthermore, if $g=GeTe/Sb_2Te_3$ (mole ratio), then the composition range of $0.5 <g<3.0$ is preferable. If g is 0.5 or less, the thermal resistance stability is reduced, whereas if g is 3.0 or greater, the sensitivity of the recording layer is reduced, even though the thermal stability remains good.

For the preparation of these layers, a vacuum deposition process or a sputter process may generally be utilized. When sputtering is used to prepare this embodiment of the invention, the sputtering may be performed in a mixture of a rare gas such as argon and nitrogen gas. As explained above, during sputter deposition, the partial pressure of nitrogen in the gas is an important process parameter which determines the characteristics and quality of the active layer. During sputtering of the active layer, an appropriate range for the partial pressure of nitrogen is $1.0 \times 10^{-5}$ Torr to $1.0 \times 10^{-4}$ Torr. If the nitrogen partial pressure is less than approximately $10^{-5}$ Torr, then the effect of nitrogen during sputtering becomes small, and consequently the improvement of the repeatability characteristics as a result of the inclusion of nitrogen in the Te-Ge-Sb active layer structure becomes small. On the other hand, if the partial pressure of nitrogen during sputtering is greater than about $10^{-4}$ Torr, the optical characteristics of the active layer, such as the refractive index is affected, and the basic recording and erasing characteristics of the active layer 18, such as the rate of crystallization and non-crystallization, may be adversely affected. Accordingly, the above-mentioned range for the partial pressure of nitrogen during sputter deposition is optimum.

Experiments have been performed on the disc structure of this preferred embodiment of the invention, in which the over-write characteristics of a signal of frequency f1 =3.43 MHz and a signal of frequency f2 =1.25 MHz were measured at an outer diameter of 130 mm, on a disc rotating at 1800 rpm, which corresponds to a linear speed of 8 m/sec. The over-write was carried out by a method of simultaneously recording and erasing, in which a substantially amorphous record mark was formed by irradiation at a high laser power level of 16 mw, and then crystallized by irradiation at a low laser power level of 8 mw, with a circular laser spot of about 1 micron in diameter.

As a result of these measurements, a C/N ratio for the recorded signal of 55 db or greater was obtained, with an over-write erasability of 30 db or greater. With respect to repetitive cycling, the characteristics of bit error rates were measured, with no deterioration observed for over one million cycles.

Although the invention disclosed herein as been described with reference to particular embodiments, it is to be understood that these embodiments are merely illustrative of the different aspects and features of the invention. As such, persons skilled in the art may make numerous modifications to the illustrative embodiments described herein, and other arrangement may be devised to implement the disclosed invention which will fall within the spirit and scope of the invention described and claimed herein.

We claim:

1. An optical recording medium having a recording layer capable of absorbing energy and being converted between a substantially non-crystalline state and a substantially crystalline state, wherein said recording layer comprises a ternary alloy of Te-Ge-Sb and at least one nitride of Te, Ge, or Sb.

2. An optical recording medium comprising:
   a) a substrate;
   b) a first dielectric layer formed on one surface of said substrate;

c) a recording layer formed on said first dielectric layer, said recording layer capable of absorbing energy and being converted between a substantially non-crystalline state and a substantially crystalline state, wherein said recording layer includes a ternary alloy of Te-Ge-Sb and at least one nitride of Te, Ge, or Sb;

d) a second dielectric layer formed on said recording layer having a thickness substantially less than the thickness of said first dielectric layer; and e) a reflecting layer formed on said second dielectric layer.

3. An optical recording medium in accordance with claim 2, wherein said second dielectric layer has a thickness of 30 nm or less.

4. An optical recording medium in accordance with claim 2, wherein said first and second dielectric layers comprise a mixture of ZnS and $SiO_2$ in which $SiO_2$ is n a concentration range of 5–40 mol %.

5. An optical recording medium comprising a recording layer which includes a ternary alloy of Te-Ge-Sb and at least one nitride of Te, Ge or Sb.

6. An optical recording medium comprising:
a) a substrate;
b) a first dielectric layer formed on one surface of said substrate;
c) a recording layer formed on said first dielectric layer, said recording layer capable of absorbing energy and being converted between a substantially non-crystalline state and a substantially crystalline state, wherein said recording layer includes a ternary alloy of Ge-Te-Sb and germanium nitride;
d) a second dielectric layer formed on said recording layer having a thickness substantially less than the thickness of said first dielectric layer; and
e) a reflecting layer formed on said second dielectric layer.

7. An optical recording medium in accordance with claim 6, wherein said second dielectric layer has a thickness of 30 nm or less.

8. An optical recording medium in accordance with claim 6, wherein said first and second dielectric layers comprise a mixture of ZnS and $SiO_2$ in which $SiO_2$ is in a concentration range of 5–40 mol %.

9. An optical recording medium comprising a recording layer which includes a ternary alloy of Te-Ge-Sb dispersed in a matrix selected from the group consisting of Te nitride, Ge nitride and Sb nitride.

10. An optical recording medium having a recording layer comprising a ternary alloy composition of Sb, $Sb_2Te_3$, and GeTe, said composition further including at least one nitride of Ge, Te, or Sb.

11. An optical recording medium in accordance with claim 10, wherein the mole ratio of GeTe to $Sb_2Te_3$ is greater than 0.5 and less than 3.0.

12. An optical recording medium comprising:
a) a substrate;
b) a first dielectric layer formed on one surface of said substrate;
c) a recording layer formed on said first dielectric layer, said recording layer capable of absorbing energy and being converted between a substantially non-crystalline state and a substantially crystalline state, wherein said recording layer includes a ternary alloy of GeTe, $Sb_2Te_3$, Sb and at least one nitride of Ge, Te, or Sb;
d) a second dielectric layer formed on said recording layer having a thickness substantially less than the thickness of said first dielectric layer; and
e) a reflecting layer formed on said second dielectric layer.

13. An optical recording medium in accordance with claim 12, wherein said second dielectric layer has a thickness which is 30 nm or less.

14. An optical recording medium in accordance with claim 12, wherein said first and second dielectric layers comprise a mixture of ZnS and $SiO_2$ in which $SiO_2$ is in a concentration range of 5–40 mol %.

15. An optical recording medium in accordance with claim 12, wherein the mole ratio of GeTe to $Sb_2Te_3$ is greater than 0.5 and less than 3.0.

* * * * *